United States Patent [19]

Cannon et al.

[11] 4,267,497

[45] May 12, 1981

[54] RESOLVER INTERFACE FOR SERVO POSITION CONTROL

[75] Inventors: Lee E. Cannon; Amos R. Mansfield, Jr., both of Bozeman, Mont.

[73] Assignee: Dana Corporation, Toledo, Ohio

[21] Appl. No.: 888,482

[22] Filed: Mar. 20, 1978

[51] Int. Cl.³ .............................................. G05B 1/06
[52] U.S. Cl. .................................. 318/661; 318/608; 318/574
[58] Field of Search ............... 318/654, 661, 606, 608, 318/574; 340/347 SY

[56] References Cited

U.S. PATENT DOCUMENTS

| | | | |
|---|---|---|---|
| 3,069,608 | 12/1962 | Forrester et al. | 318/570 |
| 3,349,229 | 10/1967 | Evans | 318/661 |
| 3,744,050 | 7/1973 | Hedrick | 340/347 SY |
| 3,783,253 | 1/1974 | Anderson et al. | 318/570 |
| 3,786,331 | 1/1974 | Sommeria et al. | 318/661 |
| 3,878,983 | 4/1975 | Hamill et al. | 318/569 |
| 4,109,185 | 8/1978 | Froyd et al. | 381/608 |

*Primary Examiner*—B. Dobeck
*Assistant Examiner*—Eugene S. Indyk
*Attorney, Agent, or Firm*—Wilson, Fraser, Barker & Clemens

[57] ABSTRACT

In a control apparatus for a machine tool, a resolver interface circuit is utilized to determine whether or not the axis motors have driven the machine tool to the selected position. The resolver interface circuit synthesizes sine and cosine wave forms which are applied to a resolver which is mechanically coupled to the corresponding axis motor. The resolver interface circuit also synthesizes a signal which is phase related to the resolver excitation wave forms by the selected rotational displacement of the resolver and axis motor shafts required to achieve the selected position for the machine tool. The phase related signal and a positional feedback signal from the resolver are compared to generate an error signal to the driver for the axis motor. The selected position can be each incremental step where the axis motor is a stepping motor.

16 Claims, 4 Drawing Figures

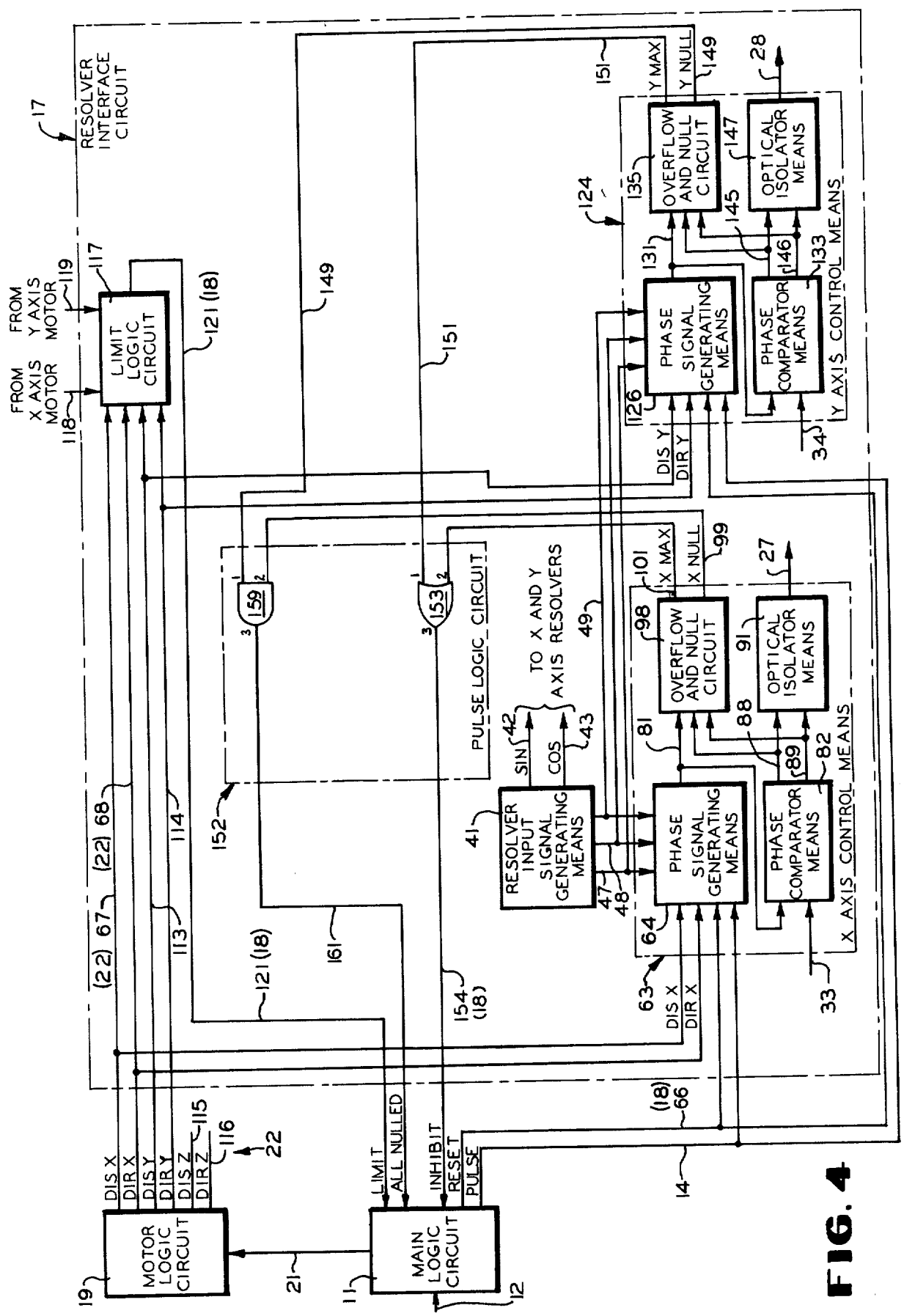

– continued –

RESOLVER INTERFACE FOR SERVO POSITION CONTROL

CROSS REFERENCE TO RELATED APPLICATION

The disclosures in copending patent application Ser. No. 731,867 filed Oct. 13, 1976 and Ser. No. 833,087 filed Sept. 14, 1977, both in the name of Lee. E. Cannon and commonly assigned herewith, are incorporated by reference.

BACKGROUND OF THE INVENTION

1. Field of the Invention.

The present invention relates to numerical control systems for driving motors in general and to a system for interfacing a resolver to such a control system in particular.

2. Description of the Prior Art.

Numerical control systems for controlling machine tools can be operated in either open-loop or closed-loop configurations. In the open-loop configuration, control signals are generated to drive means for moving the machine tool to a selected position. However, no check is made by the system to determine if the machine tool has actually reached the selected position. In the closed-loop system, a feedback signal representing the actual position of the machine tool is compared with a control signal representing the selected position to generate an error signal which is utilized to move the machine tool to the selected position.

A pair of synchros is among the most widely used error sensing devices in feedback control systems. One of the synchros has its rotor positioned so as to represent the selected position for the machine tool. An a.c. voltage is applied to the stator windings of this first or reference synchro which are connected to the stator windings of the second or control synchro. If the rotor of the control synchro is not rotationally aligned with the rotor of the reference synchro, an error voltage is generated. If the control synchro rotor position represents the actual position of the machine tool, the error signal can be utilized to position the machine tool.

SUMMARY OF THE INVENTION

The present invention concerns a circuit for interfacing a resolver to a numerical control system for a machine tool. The control apparatus generates a pulse train and control signals to individual motor drivers for each axis motor. Typically, the control signals determine the direction of rotation and times at which the motor driver actuates the associated axis motor. The rate of generation of the pulse train determines motor velocity and the rates of acceleration and deceleration.

The resolver interface circuit utilizes a free-running oscillator and a binary coded decimal counter to address a read only memory to obtain stored digital values for a sine wave form and a cosine wave form. The stored digital values are converted to analog values to synthesize wave forms which are applied to the orthogonal stator windings of a resolver for each axis motor. The rotor shaft of each resolver is mechanically coupled to the shaft of the corresponding axis motor to generate a feedback signal from the rotor windings. The feedback signal is phase related to the resolver stator excitation wave forms by the actual rotational position of the resolver and axis motor shafts. The resolver interface circuit also utilizes the counter generated address and a count total of the pulses generated to the motor driver to synthesize a signal which is phase related to the resolver excitation wave forms by the selected rotational displacement of the resolver and axis motor shafts required to achieve the selected position for the machine tool. The feedback signal and the phase related signal are then compared to generate an error signal to the driver for the axis motor.

It is an object of the present invention to improve the automatic control of machine tools.

It is another object of the present invention to efficiently interface a resolver to a numerical control system.

BRIEF DESCRIPTION OF THE DRAWINGS

FIG. 4 is a schematic diagram of the resolver circuit of FIG. 1 showing the circuit of FIG. 2 in block diagram form.

DESCRIPTION OF THE PREFERRED EMBODIMENT

Figure 1:
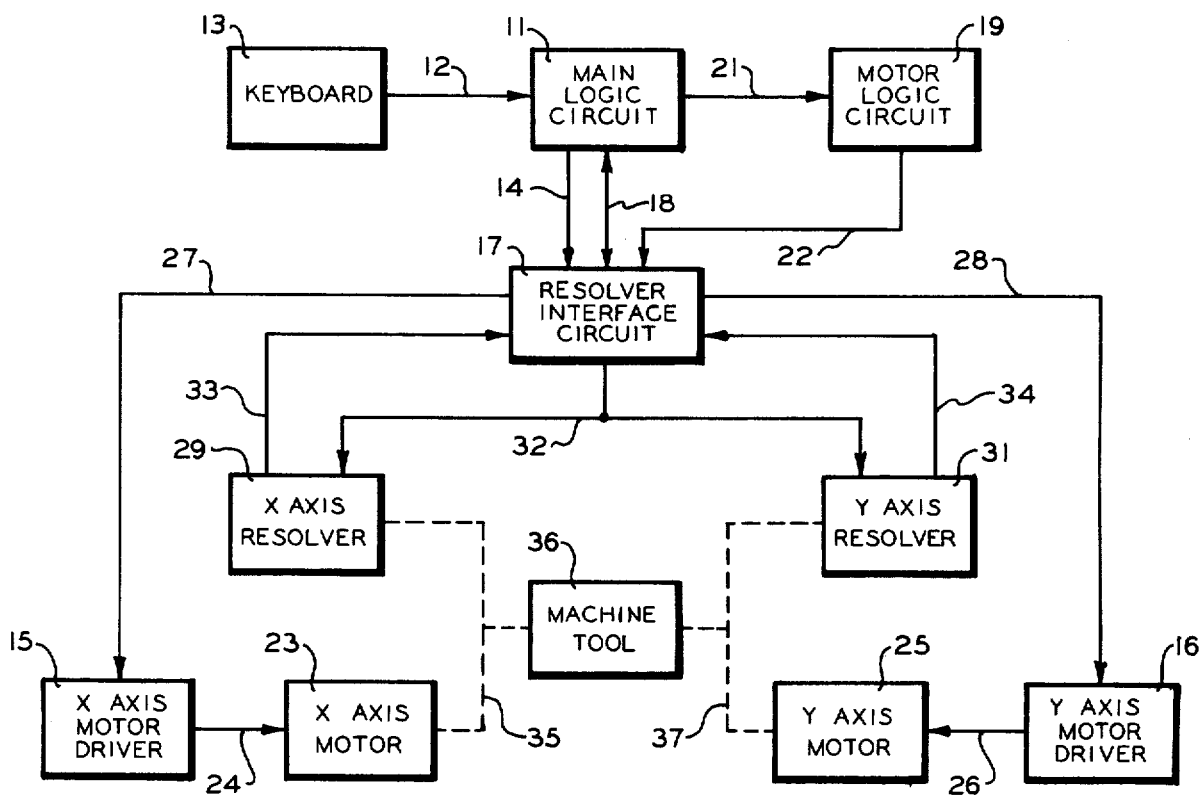
FIG. 1 is a block diagram of a machine tool control system incorporating the present invention.

Referring to FIG. 1, there is shown a block diagram of a two axis machine control system including a resolver interface circuit according to the present invention. Although the present invention can be implemented with a three axis machine control system, this description will be limited to the discussion of a two axis system to simplify the description. This system can be utilized to accurately position a machine tool at an operator selected point. The selected point and other command instructions are supplied to a main logic circuit 11 on a line 12 via a data input means such as a keyboard 13. The main logic circuit 11 generates a pulse train on a line 14 which is an input to a resolver interface circuit 17 which is connected to receive control signals from and generate control signals to the main logic circuit 11 by lines 18.

A motor logic circuit 19 receives control signals from the main logic circuit 11 on a line 21 and generates control signals on lines 22 to the resolver interface circuit 17. A pair of motor drivers 15 and 16 generate power to the X axis driving motor 23 and to the Y axis driving motor 25 respectively on a pair of lines 24 and 26 respectively. The motor drivers 15 and 16 receive control signals from the interface circuit 17 on lines 27 and 28 respectively. Although the motors 23 and 25 are typically DC, many types of AC or stepping motors can be used.

An X axis resolver 29 and a Y axis resolver 31 receive input signals on lines 32 from the resolver interface circuit 17. The resolvers 29 and 31 generate output signals on lines 33 and 34 respectively to the interface circuit 17. A dashed line 35 is representative of the mechanical interconnections between the resolver 29, the motor 23 and a machine tool 36. Another dashed line 37 is representative of the mechanical interconnections between the resolver 31, the motor 25 and the machine tool 36.

A detailed description of the main logic circuit 11 is disclosed in U.S. Patent Application Ser. No. 731,867 entitled "Stepping Motor Control Circuit" which is incorporated herein by reference. The main logic circuit 11 includes a means for accelerating and decelerating and controlling the velocity of the machine tool 36 by varying the rate of the pulse train on the line 14. The main logic circuit also includes a microprocessor (not shown) which is utilized to generate control signals on the line 21 which are decoded by the motor logic circuit 19 to generate enable and direction control signals to the resolver interface circuit 17 on the lines 22. The enable control signals are utilized to signal when the respective motors are to be stepped while the direction control signals determine the direction in which the motors are to be stepped. The motor drivers 15 and 16 provide power to the windings of the motors to operate the motors in accordance with the enable and direction commands from the motor logic circuit. In the alternative, the lines 14 and 22 can be connected to the motor drivers which can include means to scale the input pulses on the line 14 to generate a motor increment for each one, two, five or ten input pulses. This provides compensation for various mechanical systems and permits the main logic circuit to be programmed in incremental movement distances such as thousandths of an inch.

In addition to controlling the velocity, direction and the accelerating and decelerating of the machine tool, the main logic circuit can also be utilized to control the path along which the tool is to be moved. For example, the control signals on the line 21 can be generated such that the control signals on the line 22 will selectively disable the respective motor to direct the movement of the machine tool in either a linear path or a circular path having a selected radius.

The resolver interface circuit 17 is utilized in conjunction with the resolvers 29 and 31 to accurately position the machine tool at a desired point. The resolvers 29 and 31 are electromechanical transducing devices which develop voltage feedback output signals on the lines 33 and 34 respectively which signals are related to the voltage input signal on the lines 32 and rotational positions of the respective resolver shafts. For example, the voltage feedback signal on the line 33 can be phase related to the voltage input signal on the line 32 and to the shaft angle of the X axis resolver 29. As will be discussed, the same input signals are applied to the field windings of the resolvers 29 and 31 on the lines 32, while the rotor windings of resolvers 29 and 31 generate separate feedback signals on the lines 33 and 34 respectively.

The resolver interface circuit 17 receives the pulse train on the line 14 and the enable and direction control signals on the lines 22. The circuit 17 utilizes the signals on the lines 14 and 22 to generate a separate phase signal for each controlled axis representing the desired position of the respective motor shaft. The phase signals are then compared to the respective resolver feedback signals on the lines 33 and 34 to generate error control signals on the lines 27 and 28 to the motor drivers 15 and 16 respectively. The error control signals are utilized by the motor drivers to correct the position of the motor shaft such that both the motor and resolver shafts will be rotated to the desired position.

Figure 2:
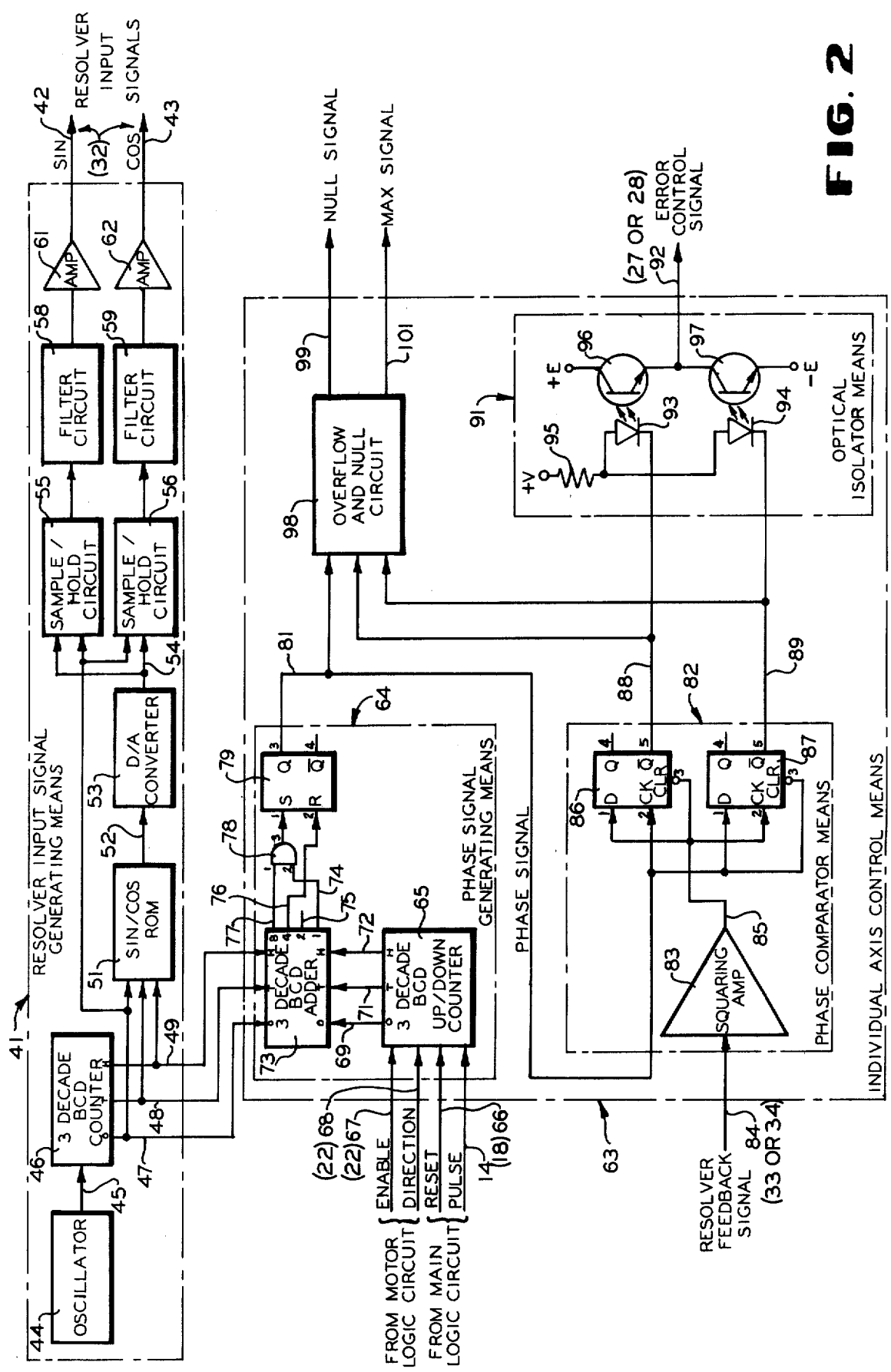
FIG. 2 is a schematic diagram of a portion of the resolver interface circuit of FIG. 1.

There is shown in FIG. 2 a portion of the resolver interface circuit 17 of FIG. 1. A resolver input signal generating means 41 generates a sine wave form (SIN) input signal on a line 42 and a cosine wave form (COS) input signal on a line 43, the lines 42 and 43 corresponding to the input signals lines 32 of FIG. 1. Typically, a resolver includes two sets of field windings (not shown) which are positioned orthogonal to one another. As will be discussed, the SIN signal is applied to one set of resolver field windings while the COS signal is applied to the other set of resolver field windings.

The resolver input signal generating means 41 includes an oscillator 44 for generating an input pulse wave form on a line 45 to a clock input of a three decade binary coded decimal (BCD) counter 46. The BCD counter 46 has output lines 47, 48 and 49 representing the ones, tens and hundreds digits respectively. Each of the lines 47, 48 and 49 are representative of four separate lines on which are generated the binary code signals for the respective digit. The tens digit line 48 and hundreds digit line 49 are utilized as address inputs to a SIN/COS read only memory (ROM) 51. The 4's bit of the ones digit line 47 is also applied as an input to the ROM 51. The ROM 51 contains stored digital values of the sine and cosine functions which are subsequently utilized to generate the SIN and COS signals on the lines 42 and 43 respectively. The value of the 4's bit of the ones digit line 47 selects either a sine or cosine function value, while the lines 48 and 49 select the address location of the specific values for the waveforms.

The SIN/COS ROM 51 cycles through one complete cosine cycle and one complete sine cycle for each cycles of one thousand counts of the BCD counter 46. Thus, the frequency of SIN and COS signals on the lines 42 and 43 respectively are determined by the frequency of the pulse wave form on the line 45. For example, if the oscillator 44 generates an output waveform at a frequency of 2.5 MHz, the SIN and COS signals will each be generated at a frequency of 2.5 KHz.

The SIN/COS ROM 51 generates a digitized output signal on a line 52 to a digital to analog (D/A) converter 53, which converts this signal to an analog output signal on a line 54. The line 54 and the 4's bit of the ones digit line 47 are inputs to a pair of sample/hold circuits 55 and 56. The circuits 55 and 56 include a switching means (not shown) for demultiplexing the sine and cosine signal values on the line 54 in accordance with the value of the 4's bit on the line 47. The individual sine and cosine signal values are then filtered by separate low pass filter circuits 58 and 59 connected to output lines from the sample/hold circuits 55 and 56 respectively. As the sine and cosine signal values are generated on the line 54 alternately, the circuits 55 and 56 sample the respective signal values and generate output signals which are proportional to the sampled input signals. During the time periods when a cosine signal is being generated and a signal value is not being generated on the line 54, the circuit 55 will continue to generate an output signal corresponding to the last sampled sine signal value. The circuit 56 functions in a similar manner when the cosine signal is being generated. The output lines of the circuits 58 and 59 are connected to a pair of power amplifiers 61 and 62 which generate the SIN and COS signals on the lines 42 and 43 respectively. Alternatively, individual sine and cosine ROMs could be utilized with a pair of D/A converters and the sample/hold circuits 55 and 56 could be eliminated.

As shown in FIG. 2, an individual axis control means 63 includes a phase signal generating means 64 having a three decade BCD up/down counter 65. The counter 65 has a clock input connected to receive the pulse train on the line 14 from the main logic circuit 11 of FIG. 1. The counter 65 has a reset input connected to receive a reset signal on a line 66 which can be one of the lines 18 from the main logic circuit 11 which signal is used to set the counter output equal to zero. An enable signal is applied to the counter 65 on a line 67 and is used to enable the counter 65 such that it counts the pulses on the line 14. A direction signal is applied to a down/up mode control input of the counter 65 on a line 68. The direction signal controls the direction of the count in accordance with direction of rotation of the respective axis motor. For example, if the axis motor is rotating in the forward or clockwise direction, the counter 65 will count up, and if the motor is rotating in the reverse direction, the counter will count down. As will be discussed, the motor logic circuit 19 of FIG. 1 generates a separate enable and a separate direction signal for each controlled axis and the lines 67 and 68 can be one pair of the lines 22.

The BCD counter 65 has output lines 69, 71 and 72 representing the ones, tens and hundreds digits respectively. Each of the lines 69, 71 and 72 are representative of four separate lines on which are generated the binary code for the respective digit. The count total output signals of the BCD counter 65 on the lines 69, 71 and 72 are inputs to a three decade BCD adder 73. The BCD adder 73 also receives the count total of the BCD counter 46 on the lines 47, 48 and 49. The adder 73 has output lines 74, 75, 76 and 77 representing the 1's, 2's, 4's and 8's bits of the hundreds digit. The output lines corresponding to the tens and ones digits (not shown) and the 2's bit line 75 of the hundreds digit are not utilized and therefore are not connected. It should be noted that any carry beyond three digits is dropped. The lines 74 and 77 are connected to a pair of inputs 78-2 and 78-1 respectively of an AND gate 78 having an output 78-3 connected to a set input 79-1 of an RS flip-flop 79. The flip-flop 79 has a reset input 79-2 connected to the line 76 and a noninverting output 79-3 connected to generate a phase signal on a line 81. An inverting output 79-4 is not utilized and therefore is not connected. The RS flip-flop 79 generates a logic "1" at the output 79-3 when the input 79-1 is at "1" and generates a logic "0" at the output 79-3 when the input 79-2 is at "1". When both inputs 79-1 and 79-2 become "0", the output 79-3 will remain at its previous logic state.

The BCD adder 73 functions in conjunction with the AND 78 and the RS flip-flop 79 to generate a phase signal on the line 81 representing the desired position of the machine tool. When the count total of the adder 73 reaches four hundred, the 4's bit line 76 will be at logic "1". Hence, the input 79-2 will be at "1" and the phase signal on the line 81 will switch from logic "1" to logic "0". The phase signal will remain at "0" until the count total of the BCD adder reaches nine hundred. At this time, the 1's bit line 74 and the 8's bit line 77 are both at "1" and the output 78-3 of the AND 78 is at "1". Hence, the input 79-1 will be at "1" and the phase signal on the line 81 will be changed to logic "1". The phase signal will remain at logic "1" until the 4's bit line 76 is again at logic "1".

The RS flip-flop 79 is connected to the counter 73 in a manner such that the phase signal on the line 81 switches logic states when the output counter total reaches four hundred and nine hundred. However, it is not necessary that phase signal switch logic states at those specific numbers. The only requirement is that the phase signal be maintained at one logic state for 50% of its range (500 counts) and that the phase signal switch to the other logic state for the other 50% of its range. Thus, for example, the RS flip-flop could be connected such that the phase signal on the line 81 switches logic states when the output count total reaches one hundred and six hundred.

The axis control means 63 includes a phase comparator means 82 having a squaring amplifier 83 which receives a resolver feedback signal on a line 84 which corresponds to the line 33 or the line 34 of FIG. 1. The feedback signal is generated by the rotor windings of the resolver and is phase related to the SIN and COS signal on the lines 42 and 43 in a manner corresponding to the angular position of the resolver shaft.

As the SIN and COS signals excite the orthogonal resolver field windings, the resolver rotor winding is magnetically coupled to these field windings to generate the feedback signal. If the rotor winding is aligned with the sine field winding, the rotor feedback signal will be in phase with the SIN signal and will receive no coupling from the cosine field winding. As the rotor turns, the coupling from the sine field winding decreases and the coupling from the cosine field winding increases. When the rotor winding is aligned with the cosine field winding, the rotor feedback signal will be in phase with the COS signal and will receive no coupling from the sine field winding. This relationship extends for the full 360° of resolver shaft rotation.

The squaring amplifier 83 functions to change the feedback signal wave form on the line 84 into a square wave form having the same frequency as the feedback signal. The square wave form is generated on a line 85 as an input to a pair of D flip-flops 86 and 87. The line 85 is connected to a logic input 86-1, a clear input 86-3 and a clock input 87-2. The phase signal line 81 is an input to a clock input 86-2, a logic input 87-1 and a clear input 87-3. A pair of non-inverting outputs 86-4 and 87-4 are not utilized and therefore are not connected.

The D flip-flops 86 and 87 function to generate output signals at inverting outputs 86-5 and 87-5 on a pair of lines 88 and 89 respectively. The output signals on the lines 88 and 89 are supplied to an optical isolator means 91 for generating an error control signal on a line 92, which corresponds to the line 27 or the line 28 of FIG. 1, to the respective axis motor driver. The lines 88 and 89 are connected to a positive voltage (+V) power supply (not shown) through a pair of light-emitting diodes (LEDs) 93 and 94 respectively and a current limiting resistor 95. a pair of phototransistors 96 and 97 are responsive to the light emitted by the LEDs 93 and 94 respectively. The phototransistor 96 has a collector connected between a positive voltage (+E) power supply (not shown) and an emitter connected to the line 92. The phototransistor 97 has a collector connected to the line 92 and an emitter connected to a negative voltage (−E) power supply (not shown).

The D flip-flop 86 generates a "1" at the inverting output 86-5 whenever the clear input 86-3 is at "0". Whenever the clock input 86-2 changes from "0" to "1", and "0" is generated at the inverting output 86-5 if a "1" is present at the logic input 86-1. The D flip-flop 87 functions in a similar manner.

Figure 3:
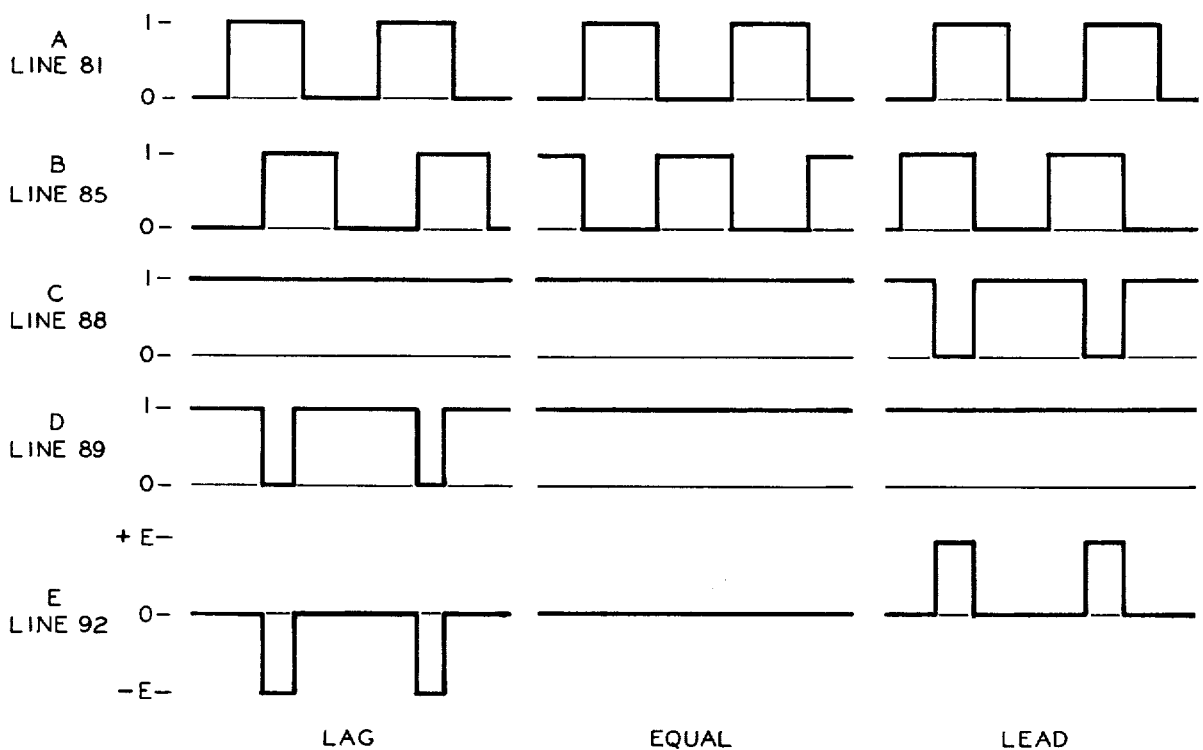
FIG. 3 is a diagram of selected wave forms generated by the circuit of FIG. 2.

There are shown in FIG. 3 wave form diagrams which illustrate the operation of the circuit of FIG. 2. As previously mentioned, the phase signal on the line 81, shown as waveform A of FIG. 3, is generated with a phase related to the desired position of the resolver shaft. The signal on the line 85, shown as waveform B, has a phase which represents the actual position of the resolver shaft. The waveforms A through E in the column designated "EQUAL" are those generated when the actual position of the resolver shaft equals the desired position. In this case, the flip-flops 86 and 87 generate "1" signals on the lines 88 and 89, shown as waveforms C and D respectively, which control the phototransistors 96 and 97 such that the error control signal on the line 92, shown as waveform E, will be at ground potential. Hence, no correction will be made in the position of the machine tool.

If the phase of the signal on the line 85 lags that of the signal on the line 81, the circuit of FIG. 2 generates the waveforms A through E shown in the "LAG" column of FIG. 3. The signals on the lines 88 and 89 are generated such that the error control signal on the line 92 is formed of negative voltage pulses having a duration which is proportional the phase difference between the signals on the lines 81 and 85. These negative voltage pulses are applied to the respective axis motor driver which in turn advances the position of the motor shaft to reduce the phase lag.

When the phase of the signal on the line 85 leads that of the signal on the line 81, the circuit of FIG. 2 generates the waveforms A through E shown in the "LEAD" column. In this case, the error control signal on the line 92 is formed of positive voltage pulses which are utilized to retract the position of the motor shaft to reduce the phase lead.

The width of the error control signal pulses generated by the circuit of FIG. 2 is proportional to the amount of error. The signal can be integrated to provide a DC level depending upon the type of motor driver.

Referring to FIG. 2, there is shown an overflow and null circuit 98 which receives the signals on the lines 81, 88 and 89 as inputs. The circuit 98 compares the signals on the lines 88 and 89 with the phase signal on the line 81 and generates a null signal on a line 99 which indicates that the phase difference between the rotor feedback signal and the phase signal is less than an adjustable threshold. As will be discussed, this null signal is utilized to generate the enable signal on the line 67 to the counter 65. The null signal is also supplied to the main logic circuit 11 of FIG. 1 to indicate that the resolver shaft is at the desired position. The circuit 98 also generates a max signal on a line 101 which indicates that the phase difference between the rotor feedback signal and the phase signal is approaching a predetermined maximum allowable phase difference, which is typically less than 180°. The max signals for all controlled axes are supplied to the main logic circuit which in turn discontinues generating the pulse train on the line 14 until the phase difference can be reduced.

There is shown in FIG. 4 the resolver interface circuit 17 according to the present invention which can be utilized in the two axis control system of FIG. 1. The resolver input signal generating means 41 of FIG. 2 is common to both axes and the axis control means 63 is utilized on the X axis. The motor logic circuit 19 generates enable signals DIS X, DIS Y and DIS Z on lines 67, 113 and 115 respectively and generates direction signals DIR X, DIR Y and DIR Z on lines 68, 114 and 116 respectively which lines correspond to the lines 22 of FIG. 1. The Z axis enable and direction signals DIS Z and DIR Z are not utilized in this two axis control system example and therefore the lines 115 and 116 are not connected.

The X and Y axis enable and direction signals are applied to a limit logic circuit 117 which functions to limit the forward and reverse currents which can be supplied to the X axis motor 23 and the Y axis motor 25.

The circuit 117 receives input signals on lines 118 and 119 representing the current being supplied to the X and Y axis motors 23 and 25 respectively. When the circuit 117 senses that the current to either the X or Y axis motor has exceeded a predetermined limit, the circuit will generate a limit signal on a line 121 to the main logic circuit 11. The line 121 can be one of the lines 18 of FIG. 1. A logic "1" on the line 121 causes the motor drivers to stop supplying current to the respective motors.

The X axis control means 63 and a Y axis control means 124 are similar to the individual axis control means of FIG. 2. The X axis phase signal generating means 64 and a Y axis phase signal generating means 126 are each connected to the resolver input signal generating means 41 by the lines 47, 48 and 49 to receive the count total of the oscillator-controlled three decade BCD counter. The enable signal DIS X on the line 67 and the direction signal DIR X on the line 68 are inputs to the phase signal generating means 64 while the enable signal DIS Y on the line 113 and the direction signal DIR Y on the line 114 are inputs to the phase signal generating means 126. The pulse signal on the line 14 and the reset signal on the line 66 are also applied to the generating means 64 and 126. The X and Y axis phase signal generating means 64 and 126 generate X and Y axis phase signals on lines 81 and 131 to X and Y axis phase comparator means 82 and 133 respectively and to X and Y axis overflow and null circuits 98 and 135 respectively.

The phase comparator means 82 receives an X axis resolver feedback signal on the line 33 and generates output signals on the lines 88 and 89 to the X axis optical isolator means 91 and to the overflow and null circuit 98. The isolator means 91 generates an X axis error control signal on the line 27 to the X axis motor driver 15 while the circuit 98 generates a null (X NULL) signal on the line 99 and a max (X MAX) signal on the line 101.

The phase comparator means 133 receives a Y axis resolver feedback signal on the line 34 and generates output signals on lines 145 and 146 to a Y axis optical isolator means 147 and to the overflow and null circuit 135. The isolator means 147 generates a Y axis error control signal on the line 28 to the Y axis motor driver 16 while the circuit 135 generates a null (Y NULL) signal on a line 149 and a max (Y MAX) signal on a line 151.

The null and max signals from both the X and Y axis control means 63 and 124 are supplied to a pulse logic circuit 152. The circuit 152 functions to generate control signals to the main logic circuit 11 and enable signals to the axis control means 63 and 124. The X MAX signal on the line 101 and the Y MAX signal on the line 151 are supplied to a pair of inputs 153-2 and 153-1 respectively of an OR gate 153. The X MAX signal is typically at logic "0" except when the phase difference between the phase signal on the line 81 and the resolver feedback signal on the line 33 approaches the maximum allowable phase difference. At this time the X axis overflow and null circuit 98 generates a "1" on the line 101. The Y axis overflow and null circuit generates the Y MAX signal on the line 151 in a similar manner. The OR 153 functions to generate a logic "1" signal at an output 153-3 whenever either the X MAX or the Y MAX signal is at "1" as an INHIBIT output signal to the main logic circuit 11 on a line 154 which can be one of the lines 18. When this signal is at "1", the main logic circuit will discontinue generating the pulse train on the line 14 until the phase difference has been reduced.

The Y NULL signal on the line 149 and the X NULL signal on the line 99 are supplied to a pair of inputs 159-1 and 159-2 of an AND gate 159. An output 159-3 of the AND 159 is connected to the main logic circuit 11 by a line 161.

The circuits 98 and 135 typically generate X NULL and Y NULL signals at logic "1" when the phase difference between the respective axis phase signal and the respective axis resolver feedback signal is less than a predetermined adjustable threshold. The AND 159 generates an ALL NULLED signal at the output 159-3 on the line 161 to the main logic circuit when both the X and Y axis control means are nulled (X NULL = 1 and Y NULL = 1) to indicate that both resolvers are "in position".

In summary, the present invention concerns an apparatus for controlling the movement of an object, such as a machine tool, along a predetermined path. The apparatus includes a motor for each axis of movement, drive means for controlling each motor in response to an error signal representing the difference between the selected position of the object and the actual position of the object, a control circuit for generating control signals representing the selected position of the object, a resolver coupled to the motor and responsive to an excitation signal for generating a feedback signal representing the actual position of the object on the path, and a resolver interface circuit for generating the excitation signal and responsive to the control signals and the feedback signal for generating the error signal. The resolver interface circuit includes means for generating a cyclic signal, such as a series of digital address signals; means responsive to the cyclic signal and the control signals for generating a phase signal having a phase relationship with the cyclic signal representing the selected position of the object; means responsive to the feedback signal and the phase signal for generating the error signal and means responsive to the cyclic signal for generating the excitation signal. In a multi-axis system, only one cyclic signal, and one excitation signal generating means are used while the phase signal and error signal generating means are duplicated for each axis.

The present invention also concerns a method for controlling a motor for moving an object along a predetermined path to a selected position. The steps of the method are: generating a cyclic series of digital address signals; generating a digital signal representing the selected position of the object; adding each digital address signal to the selected position digital signal to generate a cyclic series of digital count totals; generating a phase signal and changing its polarity in response to the generation of each of two count totals selected from the cyclic series of digital count totals, the two count totals being selected so as to generate the phase signal with equal periods of opposite polarities; generating a square wave related in phase to the cyclic series of digital address signals so as to represent the actual position of the object; generating an error signal representing the phase difference between the phase signal and the square wave; and controlling the motor in response to the error signal to drive the error signal to zero.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. In an apparatus for controlling the movement of an object along a predetermined path from an initial position to a final position including a motor for moving the object along the path, drive means for controlling the motor in response to an error signal representing the difference between a selected position intermediate the initial and final positions along the path and an actual position of the object along the path, a control circuit for generating a control signal as a train of pulses proportional in number to the distance between the initial and final positions representing the selected position, a resolver coupled to the motor and responsive to an excitation signal for generating a feedback signal representing the actual position of the object along the path and a resolver interface circuit for generating the excitation signal and responsive to the control signal and the feedback signal for generating the error signal, the resolver interface circuit comprising:

means for generating a cyclic signal;
means responsive to the control signal for accumulating the pulses and generating an instantaneous count total output signal representing the selected position;
means responsive to said cyclic signal and said count total output signal for generating a phase signal having a phase relationship with said cyclic signal representing the selected position of the object;
means responsive to the feedback signal and said phase signal for generating the error signal; and
means responsive to said cyclic signal for generating the excitation signal.

2. A circuit according to claim 1 wherein said cyclic signal generating means includes an oscillator for generating a train of pulses at a predetermined frequency and a binary coded decimal counter responsive to said pulses for generating said cyclic signal as a repeating count total of said pulses.

3. A circuit according to claim 1 wherein said cyclic signal is generated as cycles of ascending binary bit count totals and wherein said excitation signal generating means includes means responsive to each of said count totals for generating a predetermined portion of the excitation signal.

4. A circuit according to claim 3 wherein each of said count totals is a binary address and said excitation signal generating means includes means for storing magnitude values of the excitation signal wave form and is responsive to said binary addresses for generating the excitation signal wave form.

5. A circuit according to claim 4 wherein said storage means is a read only memory which generates said magnitude values as binary bits and wherein said excitation signal generating means includes means for converting said magnitude value binary bits to an analog wave form.

6. A circuit according to claim 1 wherein the excitation signal includes a sine wave form and a cosine wave form.

7. A circuit according to claim 1 wherein said phase signal generating means includes means for adding the magnitudes of said cyclic signal and said count total output signal to generate said phase signal in cyclic form.

8. A circuit according to claim 7 wherein said phase signal generating means includes means responsive to the value of the signal generated by said adding means for changing the polarity of said phase signal at two predetermined points during each cycle of said phase signal.

9. A circuit according to claim 1 wherein the feedback signal has a phase relationship with said cyclic signal representing the actual position of the object and said error signal generating means is responsive to the difference between the phase of the feedback signal and the phase of said phase signal for generating the error signal.

10. A circuit according to claim 9 wherein the drive means is responsive to the error signal for controlling the motor to reduce said phase difference to zero.

11. In an apparatus for controlling the movement of a machine tool along a predetermined path from an initial position to a final position including at least a pair of motors for moving the machine tool along corresponding axes; drive means for controlling each of the motors in response to error signals representing the difference between a selected position of the machine tool along each axis intermediate the initial and final positions and an actual position of the machine tool along each axis; a control means for generating control signals, each as a train of pulses proportional in number to the distance between the initial and final positions along the respective axis, representing the selected position of the machine tool along each axis; a separate resolver coupled to each one of the motors and responsive to an excitation signal for generating a feedback signal representing the actual position of the machine tool along the corresponding axis; and a resolver interface circuit for generating the excitation signal and responsive to the control signals and the feedback signals for generating the error signals, the resolver interface circuit comprising:
  means for generating a cyclic signal;
  means responsive to the control signal for each axis for accumulating the pulses and generating an instantaneous count total output signal for each axis representing the corresponding selected position;
  means responsive to said cyclic signal and said count total output signals for generating a phase signal for each axis having a phase relationship with said cyclic signal representing the selected position of the machine tool along the corresponding axis;
  means responsive to the feedback signal and said phase signal corresponding to each axis for generating the error signals; and
  means responsive to said cyclic signal for generating the excitation signal.

12. A circuit according to claim 11 wherein said cyclic signal generating means includes means for generating a series of address signals during each signal cycle and means responsive to said address signals for generating sine and cosine wave form components of the excitation signal.

13. A circuit according to claim 11 wherein said cyclic signal generating means includes means for generating a series of digital count totals during each signal cycle and wherein each of said count total output signals is a digital count total representing the selected position of the machine tool along the corresponding axis, means for adding each one of said series of digital count totals to said selected position count total to generate a set signal and a reset signal, and means responsive to said set and reset signals for generating said phase signal.

14. A circuit according to claim 13 wherein said means responsive to said set and reset signals generates said phase signal with one polarity during one half of each signal cycle and with the other polarity during the other half of each signal cycle and wherein each of said error signal generating means includes means responsive to the feedback signal for generating a square wave form and means responsive to the phase difference between said phase signal and said square wave form for generating the error signal.

15. A method for controlling a motor for moving an object along a predetermined path to a selected position intermediate an initial position and a final position comprising the following steps:
  a. generating a cyclic series of digital address signals;
  b. generating a digital signal representing the selected position of the object;
  c. adding each of said digital address signals to said selected position digital signal to generate a cyclic series of digital count totals;
  d. generating a phase signal and changing its polarity in response to the generation of each of two count totals selected from said cyclic series of digital count totals, said two count totals being selected so as to generate said phase signal with equal periods of opposite polarities;
  e. generating a square wave related in phase to said cyclic series of digital address signals so as to represent the actual position of the object;
  f. generating an error signal representing the phase difference between said phase signal and said square wave; and
  g. controlling the motor in response to said error signal to drive said error signal to zero.

16. The method according to claim 15 including generating an excitation signal in response to said cyclic series of address signals, applying said excitation signal to a resolver coupled to the motor to generate a feedback signal representing the actual position of the object, and generating said square wave signal in response to said feedback signal.

* * * * *